United States Patent
Liang et al.

(10) Patent No.: US 11,195,266 B2
(45) Date of Patent: Dec. 7, 2021

(54) METHOD FOR PLANNING SCREW LOCKING PATH USING ANT COLONY ALGORITHM

(71) Applicant: Wuyi University, Jiangmen (CN)

(72) Inventors: Shufen Liang, Jiangmen (CN); Huimin Xie, Jiangmen (CN); Fangchen Yang, Jiangmen (CN); Hui Huang, Jiangmen (CN); Guanhua Zou, Jiangmen (CN); Shufeng Huang, Jiangmen (CN); Baisheng Li, Jiangmen (CN); Peiran Liang, Jiangmen (CN); Zeming Wu, Jiangmen (CN); Lintao Zhu, Jiangmen (CN); Xiaoming Li, Jiangmen (CN); Lidian Liang, Jiangmen (CN); Chen Chen, Jiangmen (CN)

(73) Assignee: Wuyi University, Jiangmen (CN)

( * ) Notice: Subject to any disclaimer, the term of this patent is extended or adjusted under 35 U.S.C. 154(b) by 66 days.

(21) Appl. No.: 16/897,989

(22) Filed: Jun. 10, 2020

(65) Prior Publication Data

US 2020/0394782 A1 Dec. 17, 2020

(30) Foreign Application Priority Data

Jun. 11, 2019 (CN) .......................... 201910504120.8

(51) Int. Cl.
*G06T 7/00* (2017.01)
*G06T 7/73* (2017.01)
(Continued)

(52) U.S. Cl.
CPC ............ *G06T 7/0004* (2013.01); *B23P 19/06* (2013.01); *G06K 9/46* (2013.01); *G06K 9/6202* (2013.01);
(Continued)

(58) Field of Classification Search
CPC ......... B23P 19/06; G06K 9/46; G06K 9/6202; G06T 2207/30108; G06T 7/0004; G06T 7/73
See application file for complete search history.

(56) References Cited

U.S. PATENT DOCUMENTS

| | | | |
|---|---|---|---|
| 9,129,236 B2 * | 9/2015 | Elinas | G06Q 10/06 |
| 2014/0116209 A1 * | 5/2014 | Chung | B23P 19/003 81/430 |

FOREIGN PATENT DOCUMENTS

| | | | |
|---|---|---|---|
| CN | 107272679 A | * | 10/2017 |
| CN | 108921890 A | * | 11/2018 |

(Continued)

*Primary Examiner* — Ian L Lemieux
(74) *Attorney, Agent, or Firm* — Vivacqua Crane, PLLC

(57) ABSTRACT

Disclosed is a method for planning screw locking path using an ant colony algorithm, which includes: obtaining designated positions of screw holes to be locked; using a distance between the screw holes to be locked as pheromone; obtaining a set of initial paths for all lockings; determining whether a condition for ending an iteration is met, and the condition is whether all the locking paths have passed through all the designated positions; if the condition for ending the iteration is not met, obtaining a supplementary path for each locking path to form an entire path of each locking path until the condition for ending the iteration is met; taking a set of entire paths of all the locking paths as a set of final paths; obtaining a shortest path from the set of final paths.

5 Claims, 2 Drawing Sheets

(51) Int. Cl.
*B23P 19/06* (2006.01)
*G06K 9/46* (2006.01)
*G06K 9/62* (2006.01)

(52) U.S. Cl.
CPC ...... *G06T 7/73* (2017.01); *G06T 2207/30108* (2013.01)

(56) References Cited

FOREIGN PATENT DOCUMENTS

| CN | 109858703 A | * | 6/2019 |
| CN | 110210155 A | * | 9/2019 |
| CN | 112935775 A | * | 6/2021 |

* cited by examiner

METHOD FOR PLANNING SCREW LOCKING PATH USING ANT COLONY ALGORITHM

CROSS-REFERENCE TO RELATED APPLICATIONS

This application is based on and claims the benefit of priority from Chinese Patent Application No. 2019105041208, filed on 11 Jun. 2019, the entirety of which is incorporated by reference herein.

TECHNICAL FIELD

The present disclosure relates to the field of screw machines, in particular to a method for planning screw locking path using an ant colony algorithm.

BACKGROUND

In a process of screw locking by a screw machine, multiple screw holes are involved. In actual operation, screw locking, when performed by the screw machine, needs to be done according to a manually set locking path starting from a position where a mechanical arm is located. However, the core pursuit of an automatic screw machine is speed, the manually set locking path is not necessarily the shortest path, the automatic screw machine repeats the manually set non-shortest locking path multiple times, which may waste a lot of time, reducing the processing efficiency of the automatic screw machine. Therefore, how to obtain the shortest screw locking path is a technical problem that needs to be addressed urgently.

SUMMARY

The present disclosure aims to address at least one of the above-mentioned technical problems in the related art to at least some extent. For this reason, the present disclosure proposes a method for planning screw locking path using an ant colony algorithm.

The technical solution adopted by the present disclosure to solve the technical problems includes:

A method for planning screw locking path using an ant colony algorithm, which includes: obtaining designated positions of screw holes to be locked; using a distance between the screw holes to be locked as pheromone; obtaining a set of initial paths for all lockings; determining whether a condition for ending an iteration is met, and the condition is whether all the locking paths have passed through all the designated positions; if the condition for ending the iteration being not met, obtaining a supplementary path for each locking path to form an entire path of each locking path until the condition for ending the iteration is met; taking a set of entire paths of all the locking paths as a set of final paths; obtaining a shortest path from the set of final paths.

In an exemplary embodiment, the pheromone is a shortest distance between two screw holes obtained by calculating and comparing the distances between the screw holes.

In another exemplary embodiment, obtaining a supplementary path for each locking path to form an entire path of each locking path includes: obtaining a set of positions on the supplementary path for each locking path, and each position in the set of positions on the supplementary path is connected to a certain position and does not belong to the positions in the set of the initial paths; continuing each locking path and updating the pheromone; determining whether each locking path has reached a last position of the set of positions on the supplementary path, where the last position is a last designated position; if yes, obtaining a sub-path between the last position reached by each locking path and an end position, thereby forming the entire path of the locking path.

In another exemplary embodiment, adding only a minimum value of a path traversed by each locking path to the set of final paths.

In another exemplary embodiment, obtaining designated positions of screw holes to be locked includes: capturing an image of a product in real time by using a camera; extracting feature points from the captured image which combined with environmental features, are uses to construct a corresponding screw hole coordinate map; through feature matching, calculating a two-dimensional coordinate corresponding to the image and using the two-dimensional coordinate as a natural path coordinate.

One or more technical solutions of the present disclosure have at least the following beneficial effects: The processing path for an automatic screw machine is optimized by using an ant colony algorithm in one of the technical solutions of the disclosure. By calculating and comparing the azimuth and distance of each screw hole, the optimal path of the screw lock can be planned. This algorithm can ensure the optimal solution of the path problem, reduce the time of transmission and greatly improve the production efficiency.

BRIEF DESCRIPTION OF THE DRAWINGS

The disclosure will be further explained below with reference to embodiments when combined with the accompany drawings, in which.

DETAILED DESCRIPTION

Specific embodiments of the present disclosure will be described in detail in this section. Preferred embodiments of the present disclosure are shown in the accompanying drawings which function to supplement the description of the written description with graphics, so that each technical feature and the overall technical solution of the present disclosure can be intuitively and vividly understood, but it cannot be construed as limiting the protection scope of the present disclosure.

In the description of the present disclosure, it should be understood that orientation descriptions involved, for example, orientation or position relationships indicated by up, down, front, back, left, right, and so on, are based on the orientation or position relationships shown in the accompanying drawings, and they are intended only to facilitate the description of the present disclosure and simplify the description, rather than indicating or implying that the device or elements referred to must have a specific orientation and be constructed and operated in a specific orientation, and thus cannot be understood as limiting the present disclosure.

In the description of the present disclosure, "several" means one or more, and "a plurality of" means more than two, "greater than, less than, more than, etc.," are understood as not including the number itself, while "above, below, within, etc.," are understood as including the number itself. It should be noted that the terms first and second are only used to distinguish technical features, and cannot be understood as indicating or implying relative importance or implicitly indicating the number of technical features indicated or implicitly indicating the precedence of the technical features indicated.

In the description of the present disclosure, unless otherwise clearly defined, the terms such as "arrange", "install" and "connect" shall be understood in a broad sense. A person skilled in the art can reasonably determine the specific meanings of the above terms in the present disclosure in combination with specific contents of the technical solution.

The embodiments of the present disclosure will be further described below with reference to the accompanying drawings.

Figure 1:
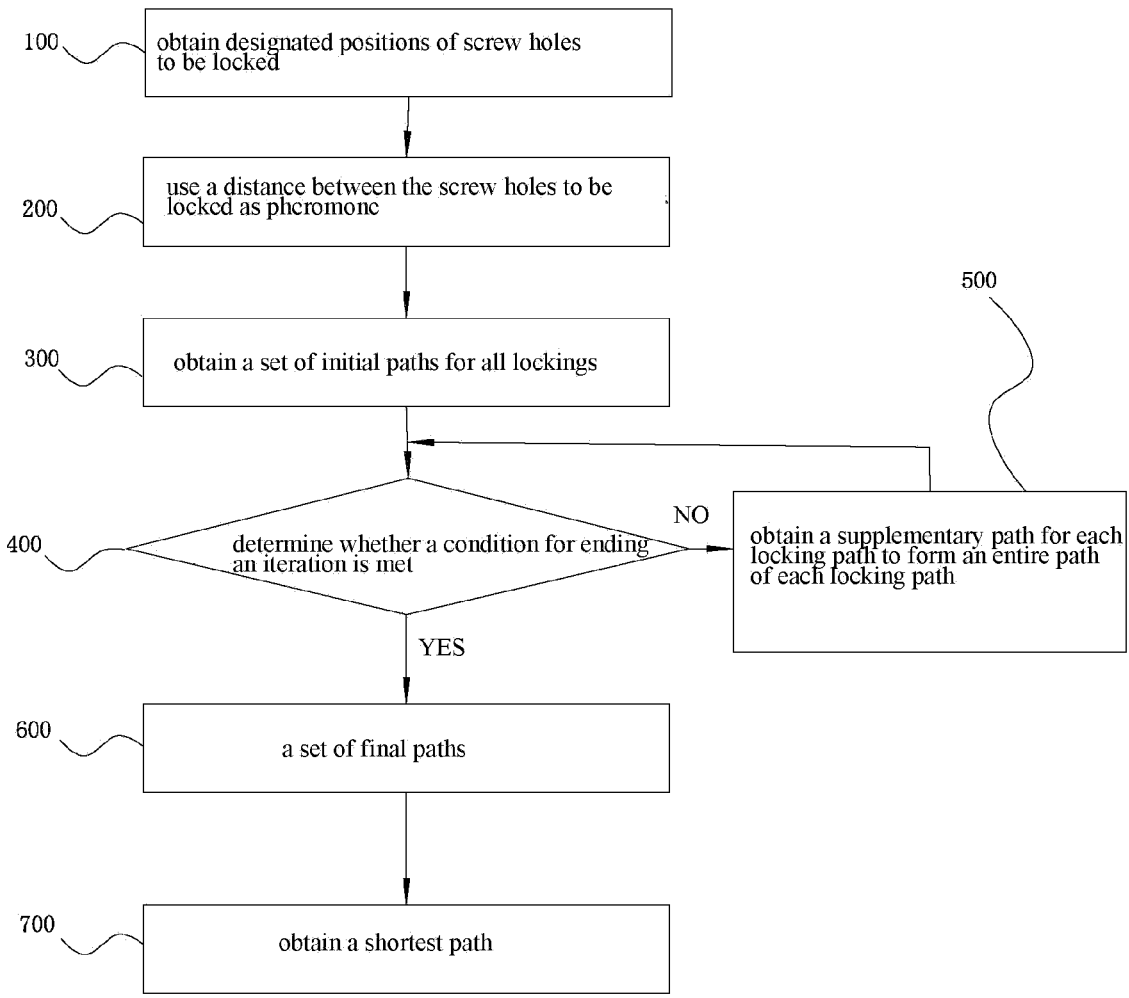
FIG. 1 is a schematic flowchart of an embodiment of the present disclosure.

Referring to FIG. 1, an aspect of the present disclosure includes a method for planning screw locking path using an ant colony algorithm, which includes:

100: obtaining designated positions of screw holes to be locked, wherein the designated positions are all the screw holes to be locked during the screw locking process;

200: using a distance between the screw holes to be locked as pheromone, in the present application, the pheromone of the ant colony algorithm is mainly obtained by measuring the distance between the screw holes to be locked;

300: obtaining a set of initial paths for all lockings, the set refers to all possible locking paths captured by a camera;

400: determining whether a condition for ending an iteration is met, and the condition is whether all the locking paths have passed through all the designated positions, if yes, implementing step 600, if not, implementing step 500;

500: if the condition for ending the iteration is not met, obtaining a supplementary path for each locking path to form an entire path of each locking path until the condition for ending the iteration is met; After step 500 is completed, implementing step 600;

600: taking a set of entire paths of all the locking paths as a set of final paths;

700: obtaining a shortest path from the set of final paths.

The processing path for an automatic screw machine is optimized by using an ant colony algorithm in the disclosure. By calculating and comparing the azimuth and distance of each screw hole, an optimal path for screw locking can be planned. This algorithm can ensure the optimal solution of the path problem, reduce the time of transmission and greatly improve the production efficiency.

In an exemplary embodiment, in the step 200, the pheromone is a shortest distance between two screw holes obtained by calculating and comparing the distances between the screw holes, which is easy to be obtained and the data is accurate.

Figure 2:
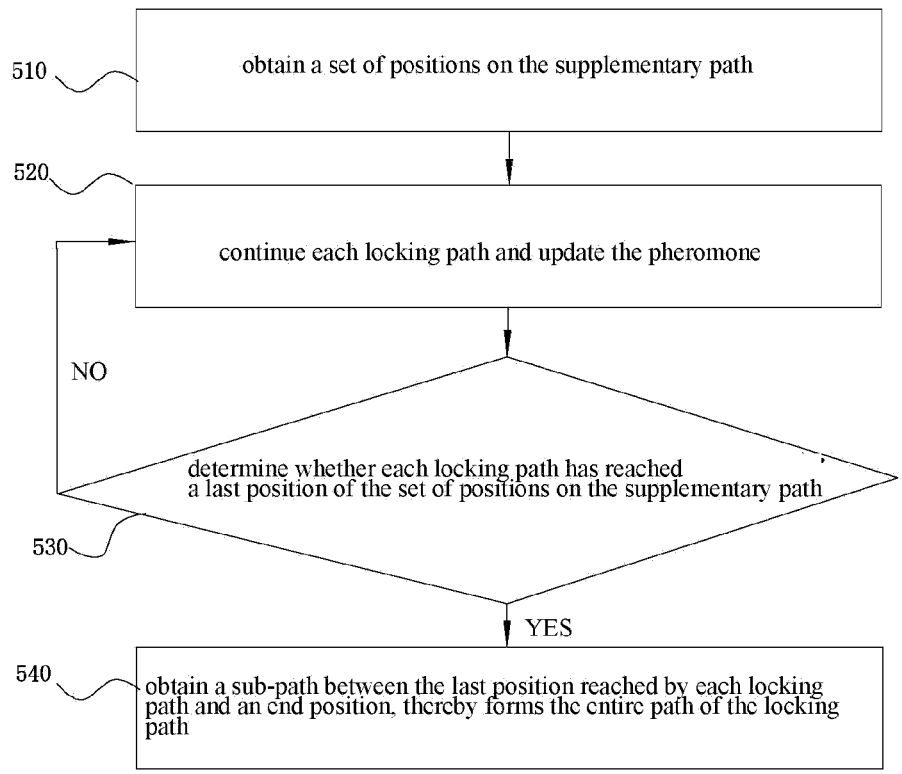
FIG. 2 is a schematic flowchart of step 500 in an embodiment of the present disclosure.

In an exemplary embodiment, referring to FIG. 2, in the step 500, obtaining a supplementary path for each locking path to form an entire path of each locking path includes:

510: obtaining a set of positions on the supplementary path for each locking path, and each position in the set of positions on the supplementary path is connected to a certain position and does not belong to positions in the set of the initial paths;

520: continuing each locking path and updating the pheromone;

530: determining whether each locking path has reached a last position of the set of positions on the supplementary path, wherein the last position is a last designated position;

540: if yes, obtaining a sub-path between the last position reached by each locking path and an end position, thereby forming the entire path of the locking path.

The above steps ensure a collection of all locking paths and provide strong support for finding the shortest path in the next step.

In another exemplary embodiment, the method further includes adding only a minimum value of a path traversed by each locking path to the set of final paths, in each of the above supplementary paths, the optimal route (the shortest route) is directly selected to be added to the set of final paths, thus improving the efficiency of obtaining the optimal path.

In another exemplary embodiment, obtaining designated positions of screw holes to be locked in step 100 includes:

110: capturing an image of a product in real time by using a camera;

120: extracting feature points from the captured image which, combined with environmental features, are used to construct a corresponding screw hole coordinate map;

130: through feature matching, calculating a two-dimensional coordinate corresponding to the image and using the two-dimensional coordinate as a natural path coordinate.

The above steps coordinate the positions of the screw holes to be locked, so that the length of all paths can be easily checked, and the efficiency of selecting the optimal solution in step 700 is improved.

It should be understood that although this specification is described in terms of embodiments, however it should not be considered that each embodiment contains one independent technical scheme. This description of the specification is merely for clarity. A person of ordinary skill in the art shall take the specification as a whole, and the technical schemes in each embodiment can be appropriately combined to form other embodiments that can be understood by a person of ordinary skill in the art.

What is claimed is:

1. A method for planning screw locking path using an ant colony algorithm, comprising:

obtaining designated positions of screw holes to be locked;

using a distance between the screw holes to be locked as pheromone;

obtaining a set of initial paths for all lockings;

determining whether a condition for ending an iteration is met, and the condition being whether all locking paths have passed through all the designated positions;

in response to the condition for ending the iteration being not met, obtaining a supplementary path for each locking path to form an entire path of each locking path until the condition for ending the iteration is met;

taking a set of entire paths of all the locking paths as a set of final paths;

obtaining a shortest path from the set of final paths.

2. The method of claim 1, wherein the pheromone is a shortest distance between two screw holes obtained by calculating and comparing the distances between the screw holes.

3. The method of claim 1, wherein obtaining a supplementary path for each locking path to form an entire path of each locking path comprising:

obtaining a set of positions on the supplementary path for each locking path, and each position in the set of positions on the supplementary path being connected to a certain position and being not any of positions in the set of the initial paths;

continuing each locking path and updating the pheromone;

determining whether each locking path has reached a last position of the set of positions on the supplementary path, the last position being a last designated position;

in response to each locking path having reached a last position of the set of positions on the supplementary path, obtaining a sub-path between the last position reached by each locking path and an end position, thereby forming the entire path of the locking path.

4. The method of claim 3, further comprising:

adding only a minimum value of a path traversed by each locking path to the set of final paths.

5. The method of claim 1, wherein obtaining designated positions of screw holes to be locked comprises:

capturing an image of a product in real time by using a camera;

extracting feature points from the captured image which combined with environmental features, are uses to construct a corresponding screw hole coordinate map;

through feature matching, calculating a two-dimensional coordinate corresponding to the image and using the two-dimensional coordinate as a natural path coordinate.

* * * * *